United States Patent [19]
Bae

[11] Patent Number: 5,917,555
[45] Date of Patent: Jun. 29, 1999

[54] COMPOSITE VIDEO SIGNAL GENERATOR

[75] Inventor: Jeom-han Bae, Suwon, Rep. of Korea

[73] Assignee: Samsung Electronics Co., Ltd., Kyungki-do, Rep. of Korea

[21] Appl. No.: 08/931,282

[22] Filed: Sep. 16, 1997

[30] Foreign Application Priority Data

Sep. 18, 1996 [KR] Rep. of Korea ............. 96-40684

[51] Int. Cl.$^6$ ................................................ H04N 9/65
[52] U.S. Cl. ........................................ 348/642; 348/654
[58] Field of Search ............................. 348/463, 654, 348/642, 586, 593, 596, 180–182, 569, 506, 659, 662; H04N 9/65

[56] References Cited

U.S. PATENT DOCUMENTS

| | | | |
|---|---|---|---|
| 4,962,427 | 10/1990 | Lann et al. | 348/558 |
| 5,051,817 | 9/1991 | Takano | 358/22 |
| 5,389,949 | 2/1995 | Nakada et al. | 345/154 |
| 5,404,230 | 4/1995 | Hong | 348/506 |
| 5,500,739 | 3/1996 | Strolle et al. | 348/642 |
| 5,579,057 | 11/1996 | Banker et al. | 348/589 |
| 5,767,920 | 6/1998 | Jo | 348/577 |

*Primary Examiner*—Victor R. Kostak
*Attorney, Agent, or Firm*—Sughrue, Mion, Zinn, Macpeak & Seas, PLLC

[57] ABSTRACT

A composite video signal generator, which can be simply implemented using an application-specific integrated circuit (ASIC), is provided. The composite video signal generator according to the present invention has an oscillator for generating a clock signal at $4 \cdot f_x$ of a color burst signal. A color burst generator creates the color burst signal by dividing the frequency of the clock signal and switching the divided clock signal according to a first control signal. A color signal is generated by phase-shifting the clock signal according to a second control signal to produce a phase-shifted clock signal, and dividing the frequency of the phase-shifted clock signal. The angle of the phase-shifting corresponds to a particular color. A luminance signal processor converts received luminance data into an analog luminance signal according to a third control signal. A timing/sync signal generator outputs the first, second, and third control signals, a composite sync signal, and outputs the luminance data included in the color signal to the luminance signal processor. A mixer mixes the color burst, the color signal, the luminance signal, and the composite sync signal to output the mixed result as the composite video signal. According to the present invention, the composite video signal generator can be easily made using an ASIC without complicated peripheral circuitry, and colors can be easily realized.

4 Claims, 3 Drawing Sheets

FIG. 4A  4fsc 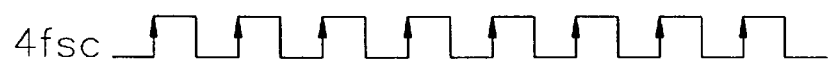
FIG. 4B  ø1 
FIG. 4C  ø2 
FIG. 4D  ø3 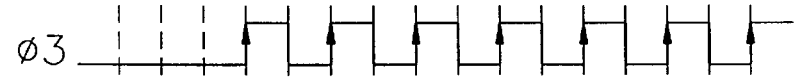
FIG. 4E  ø4 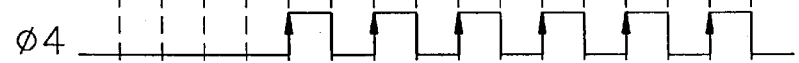
FIG. 4F  ø5 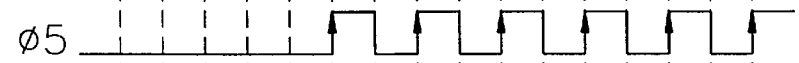
FIG. 4G  ø6 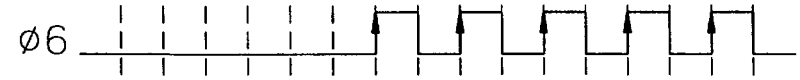
FIG. 4H  ø7 
FIG. 4I  ø8 

COMPOSITE VIDEO SIGNAL GENERATOR

BACKGROUND OF THE INVENTION

1. Field of the Invention

The present invention relates to a composite video signal generator. More particularly, it relates to a composite video signal generator for generating a composite video signal of a background image of an on-screen display (OSD).

2. Description of the Related Arts

In general, as shown in FIG. 1, the composite video signal for a background image of on-screen display (OSD) is generated by receiving an RGB signal from a digital IC 1 and using an RGB encoder IC 2 suitable for the broadcast system being employed, e.g., NTSC or PAL. Such an RGB encoder IC 2 requires complicated peripheral circuitry. Accordingly, an apparatus for generating a composite video signal, with which it is possible to generate various colors according to usage, is desirable.

SUMMARY OF THE INVENTION

It is an object of the present invention to provide a composite video signal generator which is simple enough to be implemented into a single ASIC chip and can be constructed with less expense than a conventional RGB encoder.

To achieve this object, a composite video signal generator is provided having an oscillator for generating a clock signal at $4 \cdot f_x$ of a color burst signal. A color burst generator creates the color burst signal by dividing the frequency of the clock signal and by switching the divided clock signal according to a first control signal. A color signal is generated by phase-shifting the clock signal according to a second control signal to produce a phase-shifted clock signal, and dividing the frequency of the phase-shifted clock signal. The angle of the phase-shifting corresponds to a particular color. A luminance signal processor converts received luminance data into an analog luminance signal according to a third control signal. A timing/sync signal generator outputs the first, second, and third control signals, a composite sync signal, and outputs the luminance data included in the color signal to the luminance signal processor. A mixer mixes the color burst, the color signal, the luminance signal, and the composite sync signal to output the mixed result as the composite video signal.

According to the present invention, the composite video signal generator can be easily made using an ASIC without complicated peripheral circuitry, and colors can be easily realized.

BRIEF DESCRIPTION OF THE DRAWINGS

The above object and advantages of the present invention will become more apparent by describing in detail a preferred embodiment thereof with reference to the attached drawings in which:

FIG. 4A is the waveform diagram of the signal $4 \cdot f_x$ output by the oscillator of FIG. 2; and FIGS. 4B through 4I are waveform diagrams of signals phase-shifted by 180° with reference to the $4 \cdot f_x$ waveform of FIG. 4A.

DETAILED DESCRIPTION OF THE PREFERRED EMBODIMENTS

Figure 1:
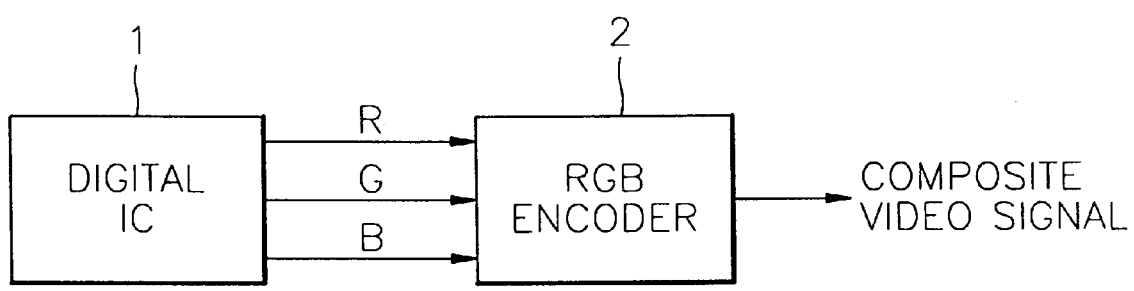
FIG. 1 is a block diagram of a conventional composite video signal generator using an RGB encoder IC.
Figure 2:
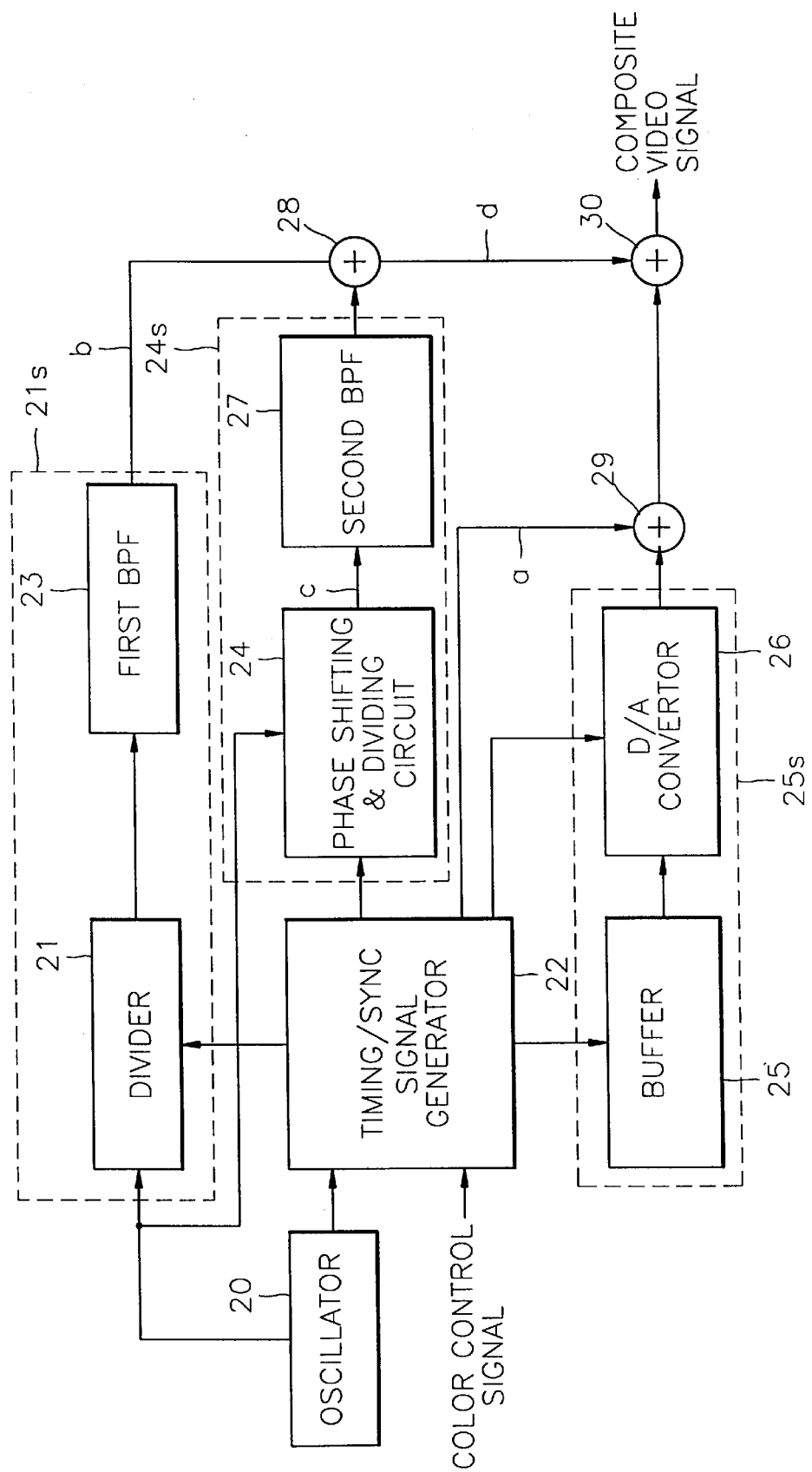
FIG. 2 is a block diagram of a composite video signal generator according to the present invention.

The composite video signal generator shown in FIG. 2 includes an oscillator 20, a color burst generator 21s, a timing/sync signal generator 22, a color signal generator 24s, a luminance signal processor 25s, a first mixer 28, a second mixer 29 and a third mixer 30. A clock signal generated by the oscillator 20 is provided to the color burst generator 21s, the timing/sync signal generator 22 and the phase shifting and dividing circuit 24.

The color burst generator 21s includes a divider 21 and a first band pass filter (BPF) 23. The divider 21 receives the clock signal from the oscillator 20 and divides such clock signal and outputs a divided clock signal having a frequency of a chroma subcarrier $f_x$, i.e., 3.58 MHz, in accordance with a first control signal from the timing/sync signal generator 22. The first BPF 23 bandpass-filters of the signal output of the divider 21 in order to output a sinusoidal wave having the frequency $f_x$ as a color burst signal.

The timing/sync signal generator 22 receives a color control signal from an external digital circuit such as an on-screen display (OSD) controller (not shown). Then, the timing/sync signal generator 22 generates control signals to control the color burst generator 21s, the color signal generator 24s, and the luminance signal processor 25s. Further, the timing/sync signal generator 22 extracts luminance data included in the external color control signal and outputs the luminance data to a buffer 25.

The color signal generator 24s receives a second control signal output of the timing/sync signal generator 22 and generates a color signal having a phase different from that of the color burst signal. Here, the color signal generator 24s includes a phase shifting and dividing circuit 24 and a second BPF 27. The phase shifting and dividing circuit 24 receives the clock signal from the oscillator 20, phase-shifts such clock signal according to the second control signal, and divides the frequency of the phase-shifted signal, and outputs the divided signal. The second BPF 27 carries out bandpass-filtering of the output signal of the phase shifting and dividing circuit 24 to create the filtered signal output as a color signal.

The luminance signal processor 25s includes a buffer 25 and a D/A converter 26. The buffer 25 stores the luminance data from the timing/sync signal generator 22. The D/A converter 26 converts the luminance data output of the buffer 25 into an analog signal.

The first mixer 28 mixes the output signal of the first BPF 23 with the output signal of the second BPF 27 and outputs the result to the third mixer 30. The second mixer 29 mixes a composite sync signal output of the timing/sync signal generator 22 with a luminance signal output of the luminance signal processor 25s and outputs the mixed signal to the third mixer 30. The third mixer 30 mixes the signals output by the first mixer 28 and the second mixer 29 and outputs the mixed signal as a composite video signal.

The operation of the composite video signal generator of FIG. 2 will now be described in more detail.

In a preferred embodiment of the present invention, the oscillator 20 generates a clock signal having a frequency of four times that of the chroma subcarrier frequency $f_x$, which is 3.58 MHz an NTSC system. However, it is noted that the frequency of the clock signal is not limited to $4 \cdot f_x$. In general, the frequency of the clock signal may alternatively be $2^N$ times (e.g., 8 times or 16 times) that of the chroma subcarrier frequency $f_x$.

The divider 21 receives the clock signal from the oscillator 20 and divides such clock signal by four to output a rectangular pulse signal having a frequency of $f_x$ in accordance with the first control signal from the timing/sync signal generator 22. The first control signal causes the divider 21 to output the signal of $f_x$ in time with a horizontal sync period of the composite video signal.

Figure 3A:
FIGS. 3A through 3D are timing diagrams showing signal waveforms output from the respective blocks of FIG. 2.
Figure 3B:

The first BPF 23 passes only the $f_x$ component of the rectangular pulse signal from the divider 21 to output a color burst having a sinusoidal waveform of FIG. 3B to the first mixer 28.

Figure 3C:

Meanwhile, the phase shifting and dividing circuit 24 receives the clock signal of $4 \cdot f_x$, shifts the phase of the clock signal by a predetermined amount which is a multiple of 45° in accordance with the second control signal containing color information, divides the frequency of the phase-shifted signal into a signal having a frequency of $f_x$, and outputs such signal. Here, the shifted amount depends on the color to be expressed. The signal output by the phase shifting and dividing circuit 24 is shown in FIG. 3C.

In a preferred embodiment of the present invention, the phase shifting and dividing circuit 24 shifts the phase of the clock signal of $4 \cdot f_x$ by multiples of 180° to obtain eight signals $\phi 1$ through $\phi 8$ shown in FIG. 4B through 4I, respectively. Then, the circuit 24 selects one of the eight signals $\phi 1$ through $\phi 8$ in accordance with the second control signal and divides the frequency of the selected signal. Thus, the divided signal has a frequency of $f_x$ and a phase shifted by a multiple of 45°.

Meanwhile, the second BPF 27 filters the signal output by the phase shifting and dividing circuit 24 to selectively pass only the frequency component around $f_x$. The first mixer 28 mixes the color burst signal with the sinusoidal color signal output of the second BPF 27, and outputs the mixed result, shown in FIG. 3D, to the third mixer 30.

Meanwhile, The timing/sync signal generator 22, which receives both the clock signal of $4 \cdot f_x$ generated by the oscillator 20 and the color control signal from an external digital circuit, counts the clock signal and outputs the composite sync signal (see FIG. 3A) to the second mixer 29. The composite sync signal includes vertical and horizontal sync signals. Also, the timing/sync signal generator 22 outputs luminance data included in the color control signal to the buffer 25, which outputs the luminance data to the D/A converter 26. The D/A converter 26 converts the luminance data from the buffer 25 into an analog signal, and outputs the analog luminance signal to the second mixer 29 as a luminance signal according to the third control signal from the timing/sync signal generator 22.

Figure 3D:

The second mixer 29 mixes the luminance signal with the composite sync signal of FIG. 3A from the timing/sync signal generator 22 and outputs the mixed signal to the third mixer 30. The third mixer 30 mixes the signal from the first mixer 28, which is shown in FIG. 3D, with the signal output by the second mixer 29, and outputs the mixed signal as the composite video signal.

The number of colors which may be represented depends on the number of possible levels of the luminance signal output from the D/A converter 26. For example, if there are 8 kinds of signals output by the phase shifting and dividing circuit 24 each having the phase difference of 45° and the D/A converter 26 receives luminance data of 4 bits to output a luminance signal having 16 possible levels, 128 colors can be obtained. Thus, the number of colors can be increased by increasing the number of the phases or the number of possible levels of the luminance signal. A complicated graphic can be processed by rapidly processing data in the buffer 25 and rapidly switching phases in the phase shifting and dividing circuit 24.

Therefore, according to the present invention, a composite video signal of various colors can be generated easily by use of a simple circuit, which may be implemented into a single ASIC chip. Also, the need for a complicated peripheral circuit is obviated.

Although the invention has been described in terms of a preferred embodiment, it will be appreciated that numerous modifications may be made to the described embodiment without departing from the spirit and scope of the present invention.

What is claimed is:

1. A composite video signal generator, comprising:

an oscillator for generating a clock signal;

a color burst generator for dividing the frequency of said clock signal to produce a divided clock signal, and for switching said divided clock signal according to a first control signal to generate a color burst of a composite video signal;

a color signal generator for phase-shifting said clock signal according to a second control signal to produce a phase-shifted clock signal, and for dividing the frequency of said phase-shifted clock signal to generate a color signal of the composite video signal, wherein the angle of the phase-shifting corresponds to a color;

a luminance signal processor for receiving luminance data and converting the luminance data into an analog luminance signal according to a third control signal;

a timing/sync signal generator for receiving a color control signal and said clock signal, for outputting said first, second, and third control signals and a composite sync signal, and for outputting the luminance data included in the color signal to said luminance signal processor; and mixing means for mixing said color burst, said color signal, said luminance signal, and said composite sync signal to output the mixed result as the composite video signal.

2. The composite video signal generator as claimed in claim 1, wherein said clock signal generated by said oscillator has a frequency which is an even multiple of a frequency of said color burst.

3. The composite video signal generator as claimed in claim 1, wherein said color burst generator comprises a first filter for filtering the switched signal to output a sinusoidal wave of the frequency of a color subcarrier.

4. The composite video signal generator as claimed in claim 3, further comprising a second filter for filtering said color signal of the composite video signal.

* * * * *